US012752327B2

(12) United States Patent
Ma et al.

(10) Patent No.: US 12,752,327 B2
(45) Date of Patent: Oct. 6, 2026

(54) THIN-WALLED COMPOSITE PIPE WITH HIGH THERMAL CONDUCTIVITY, AND PREPARATION METHOD AND APPLICATION THEREOF

(71) Applicants: XI'AN JIAOTONG UNIVERSITY, Xi'an (CN); SHAANXI ZINC INDUSTRY CO., LTD., Shangluo (CN)

(72) Inventors: Shengqiang Ma, Xi'an (CN); Ping Lv, Xi'an (CN); Yusheng Liu, Xi'an (CN); Jiandong Xing, Xi'an (CN); Jing Xu, Shangluo (CN); Jiankang Zhang, Shangluo (CN); Jiaxu Chen, Xi'an (CN); Maojiang Ye, Xi'an (CN); Gaofeng Ma, Shangluo (CN); Wenmin Niu, Shangluo (CN)

(73) Assignees: XI'AN JIAOTONG UNIVERSITY, Xi'an City (CN); SHAANXI ZINC INDUSTRY CO., LTD., Shangluo City (CN)

( * ) Notice: Subject to any disclaimer, the term of this patent is extended or adjusted under 35 U.S.C. 154(b) by 141 days.

(21) Appl. No.: 18/943,070

(22) Filed: Nov. 11, 2024

(65) Prior Publication Data

US 2025/0065386 A1 Feb. 27, 2025

(30) Foreign Application Priority Data

Jan. 12, 2024 (CN) ........................ 202410051976.5

(51) Int. Cl.
*B21C 23/08* (2006.01)
*B21C 29/00* (2006.01)
(Continued)

(52) U.S. Cl.
CPC .......... *B21C 23/085* (2013.01); *B21C 29/003* (2013.01); *C22C 18/04* (2013.01); *H01B 12/12* (2013.01)

(58) Field of Classification Search
CPC ... B21C 23/002; B21C 23/085; B21C 23/217; B21C 29/003; B21C 29/02
See application file for complete search history.

(56) References Cited

U.S. PATENT DOCUMENTS 4,731,129 A * 3/1988 Purnell .................. C22C 18/04 148/564
9,486,337 B2 * 11/2016 Bayer ................... B21K 23/00
(Continued)

FOREIGN PATENT DOCUMENTS

CN 117327958 A 1/2024

OTHER PUBLICATIONS

CN 109433841A, Guan et al. Mar. 2019.*
(Continued)

*Primary Examiner* — Edward T Tolan

(57) ABSTRACT

A method for preparing a thin-walled composite pipe is provided, in which an AlN particle/zinc-aluminum 27 ($AlN_p$/ZA27) composite billet is subjected to multi-pass reciprocating extrusion at 250-350° C., and then loaded into a pipe extrusion die. The composite billet is heated with the temperature being in an ascending gradient distribution (within a range of 250-350° C.) along an extrusion direction from the billet to an outlet of the die, then kept a preset temperature for a period of time, and finally extruded at a rate of 0.1-0.5 mm/s to obtain the thin-walled composite pipe. A thin-walled composite pipe prepared by this method is also provided, including an AlN particle and a ZA27 alloy.

12 Claims, 2 Drawing Sheets

(51) Int. Cl.
*C22C 18/04* (2006.01)
*H01B 12/12* (2006.01)

(56) References Cited

U.S. PATENT DOCUMENTS

2007/0107813 A1 5/2007 Takagi et al.
2024/0024938 A1* 1/2024 Müller .................. B21C 23/142

OTHER PUBLICATIONS

CN 117327958A, Ma et al. Jan. 2024.*
CN 104416005A, Chen Mar. 2015.*
CN 112342420A, Liu et al. Feb. 2021.*
CN 110117743B, Ma et al. Aug. 2020.*
CN 113926873A, Huang et al. Jan. 2022.*

* cited by examiner

THIN-WALLED COMPOSITE PIPE WITH HIGH THERMAL CONDUCTIVITY, AND PREPARATION METHOD AND APPLICATION THEREOF

CROSS-REFERENCE TO RELATED APPLICATIONS

This application claims the benefit of priority from Chinese Patent Application No. 202410051976.5, filed on Jan. 12, 2024. The content of the aforementioned application, including any intervening amendments thereto, is incorporated herein by reference in its entirety.

TECHNICAL FIELD

This application relates to wire materials for the power transmission, and more particularly to a thin-walled composite pipe with high thermal conductivity, and a preparation method and application thereof.

BACKGROUND

Copper wire has been widely used in power transmission and electronic devices owing to its excellent electrical and thermal conductivity, strong corrosion resistance and high strength. Compared with other wire materials, the copper wire is more suitable in the power transmission due to its smaller electrical resistance and loss. However, the copper wire is relatively costly, and fails to offer sufficient strength in a tension state. Therefore, it is important to find an economic material with high electrical and thermal conductivity to replace the copper wire and form a copper composite wire material, so as to effectively reduce the consumption of copper resources.

Copper-clad aluminum composite material has been developed to reduce the consumption of metal copper since the 1970s. Copper-clad aluminum composite wire is characterized by small diameter and good electrical conductivity, and its batch industrial production has been accomplished, thereby addressing problems of copper replacement and import dependency. In recent years, zinc-aluminum (ZA) alloy, having excellent castability, excellent wear resistance, and high thermal and electrical conductivity, has attracted considerable attention, where ZA27 exhibits outstanding performance, and has been gradually used to replace the traditional aluminum-copper casting alloy in various engineering applications. ZA27 alloy, containing 71 wt. % of zinc, 27 wt. % of aluminum and 2 wt. % of copper, has an electrical conductivity of 29.7% IACS (International Annealed Copper Standard), and is considered as an ideal substitute for copper wire. During the power transmission, electric current will induce vibration of the lattices in the wire to generate heat when passing through the wire. If the heat cannot be dissipated in time, it will inevitably lead to overheating of the wire and reduction of the electrical conductivity. Introducing ceramic particles with high thermal conductivity to prepare a metal matrix composite material is widely accepted as an effective way to improve the metal thermal conductivity. The commonly-used ceramic particles include AlN and SiC, where AlN is widely preferred because of excellent strength, high thermal conductivity and high stability. Therefore, AlN ceramic particles are added to the ZA27 alloy to improve thermal conductivity, strength and wear resistance, and the zinc-clad copper composite material prepared from the AlN-reinforced ZA27 alloy can effectively improve comprehensive performance and service life of the copper wire and reduce the consumption of copper resources.

It is required to first prepare an $AlN_p$/ZA27 composite pipe with good thermal and electrical conductivity in the preparation of the zinc-clad copper composite material. The as-cast $AlN_p$/ZA27 composite material cannot be directly formed into a thin-walled pipe due to the defects occurring in the casting process, such as shrinkage and porosity. Pre-processing an as-cast composite material by a severe plastic deformation process (SPD), such as reciprocating extrusion, can effectively eliminate casting defects, refine grains and improve the material strength and plasticity. At the same time, friction heat and deformation heat will cause temperature rise to the material during the extrusion process, which will further significantly affect the flow uniformity during the material deformation. Variable-temperature extrusion has been recognized as an optimal solution to realize uniform deformation of the material, improve service life of die and reduce the deformation force as a force-saving forming process, in which the temperature distribution of a billet along a length direction or extrusion direction is changed. On one hand, it can compensate for the temperature rise caused by the deformation heat or temperature decrease caused by heat dissipation of different parts of the die, so as to prevent the billet or die from cracking in the extrusion process; on the other hand, the temperature is controlled to control hardness, deformation resistance, fluidity and extrusion formability of the billet along the length direction. In the extrusion process, a control strategy of a thin-walled pipe prepared by forward extrusion regarded as so-called hard-billet pushing soft-billet in the die for easy extrusion and smoothly squeezing out is employed in the method; that means a side of the billet close to an extrusion ram has a lower temperature and a higher hardness, and a side of the billet close to the extrusion outlet side has higher temperature, lower hardness, good fluidity and low extrusion resistance, so that the billet is relatively hard at the top and relatively soft at the bottom in an extrusion direction, which greatly improves the extrusion formability and yield rate of a thin-walled pipe material and reduces cracking of the die and the billet employed by temperature-gradient extrusion or variable-temperature extrusion in the die along the extrusion direction (i.e., hard-billet pushing soft-billet in the die).

In summary, combining reciprocating extrusion and variable-temperature extrusion to prepare the $AlN_p$/ZA27 composite pipe can effectively promote the application of zinc alloy in the zinc-clad copper composite material, and such a preparation process has a great application potential in improving the comprehensive performance of the copper wire and reducing the consumption of copper resources.

SUMMARY

In view of the defects of the prior art, this application provides a thin-walled composite pipe with high thermal conductivity, and a preparation method and application thereof. By controlling the temperature gradient along a length direction, the billet formability is enhanced, and the surface quality of an extruded pipe is improved. Moreover, the die cracking can be prevented to prolong the service life. In summary, this application can solve technical problems in the existing extrusion molding process of thin-walled pipes, such as poor fluidity, non-uniform deformation, excessive forming force, the occurrence of cracking on the die and extruded product, and larger forming difficulties.

Technical solutions of this application are described as follows.

In a first aspect, this application provides a method for preparing a thin-walled composite pipe, comprising:

(1) subjecting an AlN particle/zinc-aluminum 27 ($AlN_p$/ZA27) composite billet to multi-pass reciprocating extrusion to obtain an extruded $AlN_p$/ZA27 composite;

(2) heating the $AlN_p$/ZA27 composite to a preset temperature, wherein a heating temperature of the heating is in an ascending gradient distribution along an extrusion direction from the extruded $AlN_p$/ZA27 composite to an outlet of an extrusion die; and (3) keeping the extruded $AlN_p$/ZA27 composite at the present temperature followed by extrusion to obtain the thin-walled composite pipe.

In some embodiments, the multi-pass reciprocating extrusion is performed at 250-350° C.

In some embodiments, the temperature of the heating is in the ascending gradient distribution within a range of 250-350° C.

In some embodiments, the extruded $AlN_p$/ZA27 composite is kept at the preset temperature for 0.5-1.5 h.

In some embodiments, in step (3), the extrusion is performed at a speed of 0.1-0.5 mm/s to obtain the thin-walled composite pipe.

In some embodiments, a temperature of the multi-pass reciprocating extrusion is altered within a range of 250-350° C. at an interval of 10-30° C. along a length direction.

In a second aspect, this application provides a thin-walled composite pipe prepared by the above method, wherein a chemical composition of the thin-walled composite pipe comprises an AlN particle and ($AlN_p$) and a ZA27 alloy; and a volume percentage φ of the AlN particle in the thin-walled composite pipe is 4%.

In some embodiments, the ZA27 alloy comprises 70.05%-71.00% by weight of zinc (Zn), 27.00%-27.20% by weight of aluminum (Al), 2.00%-2.05% by weight of copper (Cu), and magnesium (Mg) being remainder.

In some embodiments, a particle size of the AlN particle is 0.8-1 μm.

In a third aspect, this application provides a power transmission wire, comprising:

the thin-walled composite pipe prepared by the above method.

Compared to the prior art, this application has at least the following beneficial effects.

This application provides the thin-walled composite pipe with high thermal conductivity and its preparation method. By controlling the temperature gradient along a vertical direction, compensating for the temperature rise caused by the deformation heat and temperature decrease caused by heat dissipation of different parts of the die, so as to improve the billet formability and surface quality of the extruded pipe, reduce cracking of the die and prolong service life of the die. The thin-walled composite pipe prepared by the method (variable-temperature extrusion) of the present disclosure undergoes obvious dynamic recrystallization, and an average grain size of the generated undistorted equiaxed crystal is less than 1 μm, thereby realizing the strengthening and toughening of the material under the action of fine grain strengthening.

In some embodiment, before the extrusion, the as-cast $AlN_p$/ZA27 composite material is subjected to the multi-pass reciprocating extrusion at 250-350° C., which can effectively eliminate casting defects occurring in the casting process, such as shrinkage and porosity, refine grains and improve the material strength and plasticity.

In some embodiments, a eutectoid transformation temperature of the ZA27 alloy is 275° C. By setting the extrusion temperature at 250-350° C., the heat extrusion formability of β and (α+η) constitutes of the ZA27 alloy can be explored. Additionally, by changing the temperature, $AlN_p$/ZA27 composite pipe with optimal microstructure, mechanical property and thermal conductivity can be obtained.

In some embodiments, after the billet is heated to a specific temperature, the billet is kept at the preset temperature for 0.5-1.5 h to ensure that the billet is completely heated, so that the billet has uniformly changing temperature gradient distribution along the length direction.

In some embodiments, the extrusion rate (movement rate of the ram) of 0.1-0.5 mm/s is controlled to maximize the production efficiency under the premise of maintaining the fluidity and formability of the billet, and improve the accuracy of the shape and size of the extruded pipe, microstructure, and uniformity of mechanical property and thermal conductivity along a cross section and the length direction.

In some embodiments, during the variable temperature extrusion, a side of the billet close to the extrusion ram has a temperature of 250-300° C., and a side of the billet close to the extrusion side has a temperature of 300-350° C. with an interval of 10-30° C. The side of the billet close to the extrusion ram has a lower temperature and a higher hardness, and the side of the billet close to the extrusion side has a higher temperature, a lower hardness and good fluidity, which greatly improves the extrusion formability, yield rate and good product rate of the billet.

In some embodiments, the microstructural of the $AlN_p$/ZA27 composite pipe prepared by variable temperature extrusion is observed. After the variable temperature extrusion, the $AlN_p$/ZA27 composite pipe undergoes obvious dynamic recrystallization. Morphologies of α-Al and η-Zn are transformed into undistorted equiaxed grains where the average grain size is less than 1 μm, and α-Al fine grains are distributed on a η-Zn matrix in a network shape. Cu-rich precipitated phase is observed in intergrains and grain boundaries. Some AlN particles are also broken and distributed along the extrusion direction. Under the combined action of fine grain strengthening and second-phase strengthening, the mechanical property and thermal conductivity of the material are effectively improved.

In some embodiments, ensuring constant higher temperature of an die orifice can effectively maintain a lower deformation resistance of the metal in a deformation area near the die orifice and uniformity of a metal deformation flow state, so that pressure on a die surface of the die orifice is basically unchanged, which not only prolongs the service life of the die and a die core, but also greatly improves the surface quality of the $AlN_p$/ZA27 composite pipe and reduces cracking of the pipe during the extrusion process.

In some embodiments, before heating, an outside of a heating coil is wrapped with a flame-resistant cotton and refractory felt, effectively improving heating efficiency of the heating coil and reducing heat loss of the billet during pipe extrusion, which ensures quality and stability of pipe production.

In some embodiments, after the billet is put into the die, an intelligent-control pressure processing system is used to pre-compact the billet in the die, which reduces a gap between the die and the billet and improves the extrusion efficiency.

In summary, the method for preparing the thin-walled composite pipe with high thermal conductivity by the variable temperature extrusion provided herein has reasonable extrusion temperature and appropriate extrusion rate, and can effectively compensate for temperature changes of the billet and the die through gradient temperature extrusion, which improves the formability of the billet, reduces the cracking of the die, prolongs the service life of die and has good application prospect in the power transmission line materials.

The technical solutions of the present disclosure will be further described in detail with reference to the accompanying drawings and the embodiments.

Figure 1:
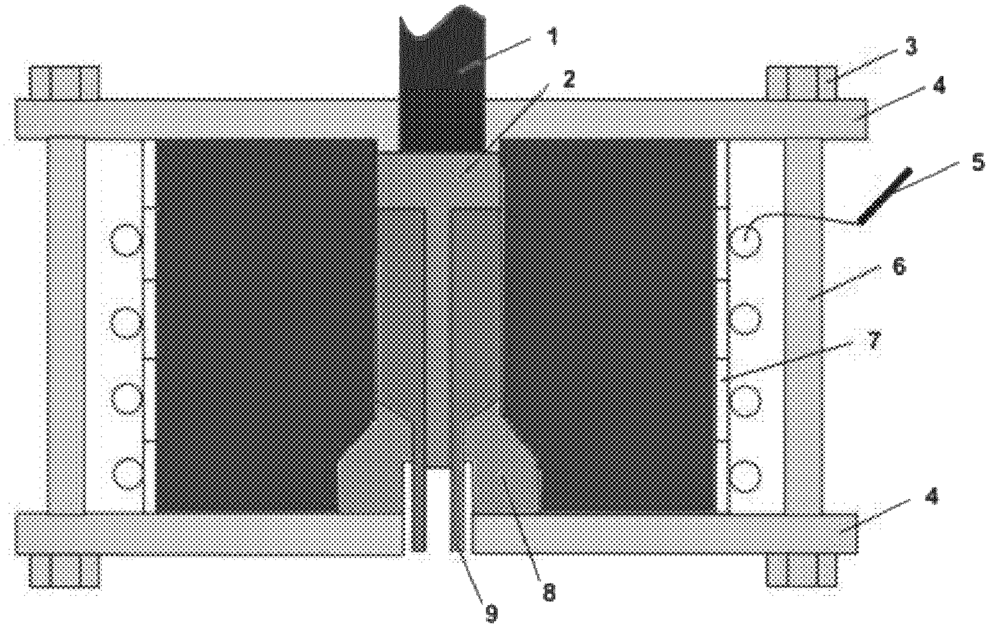
FIG. 1 schematically illustrates assembly of a variable-temperature extrusion die for pipes according to an embodiment of the present disclosure.

In the figures: 1, ram; 2, die core; 3, screw; 4, clamp plate; 5, thermocouple; 6, screw rod; 7, heating coil; 8, die; and 9, billet.

DETAILED DESCRIPTION OF EMBODIMENTS

The technical solutions of the present disclosure will be clearly and completely described below. It is obvious that described herein are only some embodiments of the present disclosure, rather than all embodiments. Based on the embodiments provided herein, other embodiments obtained by those of ordinary skill in the art without making creative effort shall fall within the scope of the present disclosure.

In the present disclosure, unless otherwise defined, individual embodiments described herein and technical features therein can be combined to form new technical solutions in the absence of contradiction.

In the present disclosure, unless otherwise defined, the symbol "%" indicates a weight percent of individual components relative to a composition, and the term "part" indicates part by weight.

In the present disclosure, unless otherwise defined, components described herein or their preferred components can be combined with each other to form new technical solutions.

In the present disclosure, unless otherwise defined, a numerical range "a-b" covers any real number combination between "a" and "b", where both a and b are real numbers. For example, a numerical range "6-22" represents that all real numbers between 6 and 22 are listed in the present disclosure, and "6-22" is only an abbreviated representation of a combination of these values.

A "range" disclosed in the present disclosure is in the form with a lower limit and an upper limit, where the lower limit includes one or more lower limits, and the upper limit includes one or more upper limits.

In the present disclosure, the term "and/of" used herein includes a combination of one or more associated items or all possible combinations thereof.

In the present disclosure, unless otherwise defined, each individual reaction or operating step can be performed sequentially or be performed according to a sequence. In some embodiments, reaction method in the present disclosure is performed in sequence.

Unless otherwise defined, technical terms and scientific terms used herein have the same meaning as those familiar to those of ordinary skill in the art. In addition, any method or material which is similar or equal to disclosure herein may be applied to the present disclosure.

A thin-walled composite pipe with high thermal conductivity, and a preparation method and application thereof are provided herein. An outer side of an extrusion container of a pipe extrusion die is provided with four heating coils, and each of the four heating coils is connected to a thermocouple. An $AlN_p$/ZA27 composite billet is subjected to multi-pass reciprocating extrusion at 250-350° C. to obtain a tubular extrusion raw material. The tubular extrusion raw material, after being applied with a boron nitride lubricant, is loaded into the extrusion container together with a die core. Then, a die is put into the extrusion container. A clamp plate is assembled at two ends of the extrusion container, and is configured to clamp the die. After a complete assembly of the pipe extrusion die, the pipe extrusion die is put into the intelligent-control pressure processing system to be pre-compacted. Each of the four heating coils is controlled to heat to 250-350° C. The tubular extrusion raw material is kept at 250-350° C. for 0.5-1.5 h, and is extruded at an extrusion rate (movement rate of a ram) of 0.1-0.5 mm/s to obtain an $AlN_p$/ZA27 composite pipe with high thermal conductivity. The method for preparing the thin-walled composite pipe with high thermal conductivity by variable temperature extrusion provided herein has reasonable control of extrusion temperature distribution, uniform extrusion of pipe controlled by gradient temperature along an extrusion direction, high output rate of pipe and appropriate extrusion rate, and can effectively compensate for temperature changes of the billet and the die through gradient temperature extrusion, which ensures a high extrusion ratio section of the billet has a higher temperature during flowing, forms a temperature control of the billet, improves gradient fluidity of the billet and an extrusion material of an outlet of the pipe, improves the formability of the billet, reduces the cracking of the die, prolongs the service life of die and has good application prospect in the power transmission line materials.

A method for preparing a thin-walled composite pipe with high thermal conductivity is provided, including the following steps.

(S1) An $AlN_p$/ZA27 composite billet is subjected to reciprocating extrusion and turning processing to obtain a raw tubular extrusion billet for extrusion-waiting billet. Around hole is formed in the extrusion billet centre to place the die core or mold core to form thin-walled pipes of different thicknesses when the billet and the mold core simultaneously are applied to move through the die under the extrusion force. A boron nitride lubricant is applied onto a surface of the tubular extrusion billet.

The extrusion billet with a centre through hole (i.e. tubular extrusion billet as raw material for extrusion) has an external diameter of (φ=29.5-30.5 mm, a length of L=55.0-60.0 mm and an inner diameter of φ=6.0-10.0 mm.

(S2) Four heating coils 7 are respectively provided on an outer side of an extrusion container, and are respectively connected to a thermocouple 5 and a temperature control system.

(S3) The tubular extrusion billet obtained from the step (S1) is loaded into the extrusion container together with the mold core or die core. A die 8 is mounted on a bottom of the extrusion container. Two ends of the extrusion container are each provided with a clamp plate to fix the middle die.

(S4) The pipe extrusion die assembled in the step (S3) is pre-compacted by an intelligent-control pressure processing system.

(S5) A power supply is turned on to control the four heating coils to heat the billet to 250-350° C. in a gradient temperature pattern along a length direction of the billet with a temperature interval of 10-30° C., and the billet is kept at 250-350° C. for 0.5-1 h. An outside of each heating coil is wrapped with a flame-resistant cotton for thermal insulation.

(S6) The pressure processing system is started to extrude the billet at a rate of 0.1-0.5 mm/s (i.e., movement rate of a ram).

(S7) The power supply is turned off, and the die and the extrusion container are cleaned. A thin-walled composite pipe with high thermal conductivity is obtained.

A chemical composition of the thin-walled composite pipe prepared by the above method is represented by $AlN_p$/ZA27, where a volume percentage Y of the AlN particle is 4%, and a particle size of the AlN particle is 0.8-1 μm; and the ZA27 alloy includes 70.05%-71.00% by weight of zinc (Zn), 27.00%-27.20% by weight of aluminum (Al), 2.00%-2.05% by weight of copper (Cu), and magnesium (Mg) being remainder.

According to a microstructure diagram, the thin-walled composite pipe prepared by the method (variable-temperature extrusion) of the present disclosure undergoes obvious dynamic recrystallization, and an average grain size of the generated undistorted equiaxed crystal is less than 1 μm, thereby realizing the strengthening and toughening of the material under the action of fine grain strengthening.

The thin-walled composite pipe prepared by the method of the present disclosure can be applied in the power transmission wire materials.

In order to illustrate the objects, technical solutions and advantages of embodiments of this application more clearly, the technical solutions of the embodiments of this application will be clearly and fully described below with reference to the accompanying drawings. It is obvious that described herein are only some embodiments of the present disclosure, rather than all embodiments. In general, the components in the embodiments described and shown herein can be arranged and designed in different configurations. Therefore, the detailed description of the embodiments of this application with reference to the accompanying drawings is only illustrative, rather than limiting the scope of this application. Based on the embodiments provided herein, other embodiments obtained by those of ordinary skill in the art without making creative effort shall fall within the scope of this application.

Embodiment 1

An $AlN_p$/ZA27 composite billet was subjected to multi-pass reciprocating extrusion at 250° C., and transferred to the pipe extrusion die. Four heating coils are mounted on the outer side of the extrusion container, and are respectively turned on to heat the billet at 250° C., 260° C., 270° C. and 280° C. along the length direction. Then the billet is kept at the heating temperature for 0.5 h and extruded at an extrusion rate (movement rate of the ram) of 0.1 mm/s to obtain an $AlN_p$/ZA27 composite pipe with high thermal conductivity.

The $AlN_p$/ZA27 composite pipe obtained from Embodiment 1 had a smooth surface without cracking and a uniform size, and the obvious dynamic recrystallization occurred in its microstructure, and a grain size reached 0.9 μm, indicating that the variable-temperature extrusion can effectively improve the formability of the billet and the comprehensive mechanical property and thermal conductivity of the pipe.

Embodiment 2

An $AlN_p$/ZA27 composite billet was subjected to multi-pass reciprocating extrusion at 250° C., and transferred to the pipe extrusion die. Four heating coils are mounted on the outer side of the extrusion container, and are respectively turned on to heat the billet at 250° C., 275° C., 300° C. and 325° C. along the length direction. Then the billet is kept at the heating temperature for 1.0 h and extruded at an extrusion rate (movement rate of the ram) of 0.2 mm/s to obtain an $AlN_p$/ZA27 composite pipe with high thermal conductivity.

The $AlN_p$/ZA27 composite pipe obtained from Embodiment 2 had a smooth surface without cracking and a uniform size, and the obvious dynamic recrystallization occurred in its microstructure, and a grain size reached 0.85 μm, indicating that the variable-temperature extrusion can effectively improve the formability of the billet and the comprehensive mechanical property and the thermal conductivity of the pipe.

Embodiment 3

An $AlN_p$/ZA27 composite billet was subjected to multi-pass reciprocating extrusion at 300° C., and transferred to the pipe extrusion die. Four heating coils are mounted on the outer side of the extrusion container, and are respectively turned on to heat the billet at 250° C., 265° C., 280° C. and 295° C. along the length direction. Then the billet is kept at the heating temperature for 0.5 h and extruded at an extrusion rate (movement rate of the ram) of 0.5 mm/s to obtain an $AlN_p$/ZA27 composite pipe with high thermal conductivity.

The $AlN_p$/ZA27 composite pipe obtained from Embodiment 3 had a smooth surface without cracking and a uniform size, and the obvious dynamic recrystallization occurred in its microstructure, and a grain size reached 0.8 μm, indicating that the variable-temperature extrusion can effectively improve the formability of the billet and the comprehensive mechanical property and the thermal conductivity of the pipe.

Embodiment 4

An $AlN_p$/ZA27 composite billet was subjected to multi-pass reciprocating extrusion at 300° C., and transferred to the pipe extrusion die. Four heating coils are mounted on the outer side of the extrusion container, and are turned on to respectively heat the billet at 250° C., 260° C., 270° C. and 280° C. along the length direction. Then the billet is kept at the heating temperature for 1.0 h and extruded at an extrusion rate (movement rate of the ram) of 0.1 mm/s to obtain an $AlN_p$/ZA27 composite pipe with high thermal conductivity.

The $AlN_p$/ZA27 composite pipe obtained from Embodiment 4 had a smooth surface without cracking, a uniform size, no adhesive on a die surface and a clean inner cavity, and the obvious dynamic recrystallization occurred in its microstructure, and a grain size reached 0.82 μm, indicating that the variable-temperature extrusion can effectively improve the formability of the billet and the comprehensive mechanical property and the thermal conductivity of the pipe.

Embodiment 5

An $AlN_p$/ZA27 composite billet was subjected to multi-pass reciprocating extrusion at 250° C., and transferred to the pipe extrusion die. Four heating coils are mounted on the outer side of the extrusion container, and are respectively turned on to heat the billet at 250° C., 270° C., 290° C. and 310° C. along the length direction. Then the billet is kept at the heating temperature for 0.5 h and extruded at an extrusion rate (movement rate of the ram) of 0.3 mm/s to obtain an $AlN_p$/ZA27 composite pipe with high thermal conductivity.

The $AlN_p$/ZA27 composite pipe obtained from Embodiment 5 had a smooth surface without cracking, a uniform size, no adhesive on a die surface and a clean inner cavity, and the obvious dynamic recrystallization occurred in its microstructure, and a grain size reached 0.75 μm, indicating that the variable-temperature extrusion can effectively improve the formability of the billet and the comprehensive mechanical property and the thermal conductivity of the pipe.

Referring to FIG. 1, which schematically illustrates assembly of a variable-temperature extrusion die for pipes, a die core 2 of the pipe extrusion die is arranged below a ram 1 of the intelligent-control pressure processing system. The die 8 is arranged below the die core 2. The ram 1, the die core 2 and the die 8 are arranged between two clamp plates 4 arranged up and down. The two clamp plates 4 are connected to each other through a screw rod 6, and two ends of the screw rod 6 are respectively in fastening connection with a corresponding clamp through a screw 3. The billet 9 is arranged between the die core 2 and the die 8. Each of the four heating coils 7 is arranged on the outer side of the die core 2, and is connected to the thermocouple 5 to control the gradient temperature heating along the length direction on the billet. During the extrusion process conducted by the ram 1, the die core 2 and the billet 9 move synchronously to prevent the die core 2 from tilting caused by uneven flow of the material, and the billet is extruded into a thin-walled pipe at a cylinder of the die 8 to complete the preparation of the thin-walled composite pipe with high thermal conductivity.

Figure 2:
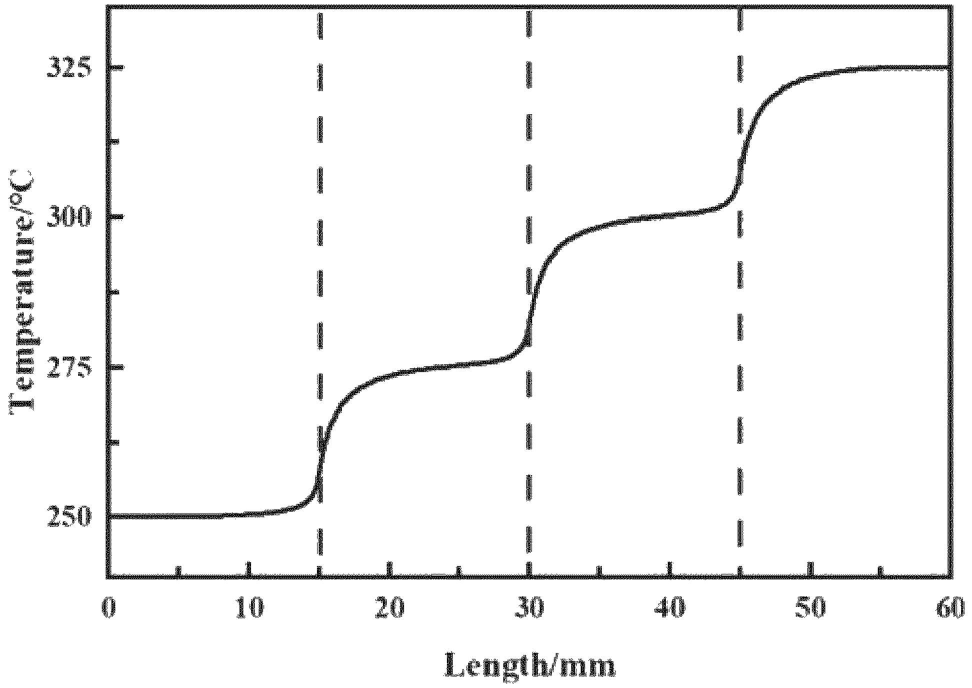
FIG. 2 shows a temperature gradient distribution of heating a billet along an extrusion direction according to an embodiment of the present disclosure.

FIG. 2 shows the temperature gradient distribution of heating the billet along the extrusion direction. An upper end face of the billet is regarded as an origin point. Temperatures of each section are in an ascending gradient distribution along the extrusion direction from the extruded $AlN_p$/ZA27 composite to an outlet of an extrusion die, and are respectively 250° C., 275° C., 300° C. and 325° C. The formability of the billet, the surface quality of the thin-walled pipe and the pipe production can be effectively improved by changing the temperatures of each section.

In summary, this application provides a thin-walled composite pipe with high thermal conductivity, and a preparation method and application thereof to improve the formability of the billet and the pipe production, reduce cracking of the die and prolong the service life of the die by controlling the gradient temperature heating along the vertical direction on the billet. According to the microstructure diagram of the thin-walled composite pipe, the thin-walled composite pipe with high thermal conductivity prepared by the method of the present disclosure undergoes obvious dynamic recrystallization, and an average grain size of the generated undistorted equiaxed crystal is less than 1 μm, thereby realizing the strengthening and toughening of the material under the action of fine grain strengthening, and providing research ideas for further development of reliable power transmission line materials.

It should be noted that embodiments described above are only illustrative, and are not intended to limit this application. Although this application is described in detail with reference to the above embodiments, those of ordinary skill in the art can still make various modifications and replacements to the technical solutions described by the above embodiments. However, any modifications and replacements made without departing from the spirit of the present disclosure shall fall within the scope of the disclosure defined by the appended claims.

What is claimed is:

1. A method for preparing a thin-walled composite pipe, comprising:

(1) subjecting an AIN particle/zinc-aluminum alloy (AIN/ZA) composite billet to multi-pass reciprocating extrusion to obtain an extruded AIN/ZA composite, wherein a zinc-aluminum alloy in the AIN/ZA composite billet comprises 70.05%-71.00% by weight of zinc (Zn), 27.00%-27.20% by weight of aluminum (Al), 2.00%-2.05% by weight of copper (Cu), and magnesium (Mg) being remainder;

(2) heating the extruded AIN/ZA composite to a preset temperature, wherein a temperature of the heating is in an ascending gradient distribution along an extrusion direction from the extruded AIN/ZA composite to an outlet of an extrusion die; and (3) keeping the extruded AIN/ZA composite at the preset temperature followed by extrusion to obtain the thin-walled composite pipe.

2. The method of claim 1, wherein the multi-pass reciprocating extrusion is performed at 250-350° C.

3. The method of claim 1, wherein the temperature of the heating is in the ascending gradient distribution within a range of 250-350° C.

4. The method of claim 1, wherein the extruded AlN/ZA composite is kept at the preset temperature for 0.5-1.5 h.

5. The method of claim 1, wherein in step (3), the extrusion is performed at a speed of 0.1-0.5 mm/s.

6. The method of claim 1, wherein a temperature of the multi-pass reciprocating extrusion is altered within a range of 250-350° C. at an interval of 10-30° C. along a length direction to meet an increasing gradient temperature distribution from top to bottom of the extrusion die.

7. A thin-walled composite pipe prepared by the method of claim 1, wherein a chemical composition of the thin-walled composite pipe comprises an AIN particle and a ZA alloy; a volume percentage o of the AIN particle in the thin-walled composite pipe is 4%; and the ZA alloy comprises 70.05%-71.00% by weight of zinc (Zn), 27.00%-27.20% by weight of aluminum (Al), 2.00%-2.05% by weight of copper (Cu), and magnesium (Mg) being remainder.

8. The thin-walled composite pipe of claim 7, wherein a particle size of the AIN particle is 0.8-1 μm.

9. The method of claim 1, wherein in step (2), the extruded AIN/ZA composite is heated by four heating coils; the four heating coils are distributed along a length direction of the extruded AIN/ZA composite; a heating temperature of one of the four heating coils farthest from the outlet of the extrusion die is set to 250° C.; and heating temperatures of the four heating coils are set at an equal temperature interval.

10. The method of claim 9, wherein the heating temperatures of the four heating coils are sequentially set to 250° C., 275° C., 300° C. and 325° C. along the extrusion direction.

11. The method of claim 9, wherein the heating temperatures of the four heating coils are sequentially set to 250° C., 265° C., 280° C. and 295° C. along the extrusion direction.

12. The method of claim 9, wherein the heating temperatures of the four heating coils are sequentially set to 250° C., 270° C., 290° C. and 310° C. along the extrusion direction.

* * * * *